United States Patent
Zhao et al.

(10) Patent No.: US 8,762,120 B1
(45) Date of Patent: Jun. 24, 2014

(54) MODEL-BASED VARIABLE ALIGNMENT IN A SIMULATED ENVIRONMENT

(75) Inventors: He Zhao, Framingham, MA (US); Laura Lynn Gorka, Clinton, MA (US)

(73) Assignee: The Mathworks, Inc., Natick, MA (US)

( * ) Notice: Subject to any disclaimer, the term of this patent is extended or adjusted under 35 U.S.C. 154(b) by 444 days.

(21) Appl. No.: 13/072,489

(22) Filed: Mar. 25, 2011

(51) Int. Cl.
*G06F 9/45* (2006.01)

(52) U.S. Cl.
USPC ............................................ 703/13; 717/104

(58) Field of Classification Search
None
See application file for complete search history.

(56) References Cited

U.S. PATENT DOCUMENTS 6,070,010 A * 5/2000 Keenleyside et al. .......... 717/154
8,370,817 B2 * 2/2013 Eichenberger et al. ....... 717/136

* cited by examiner

*Primary Examiner* — Emerson Puente
*Assistant Examiner* — Deric Ortiz
(74) *Attorney, Agent, or Firm* — Harrity & Harrity, LLP

(57) ABSTRACT

A system may be configured to receive a request to generate code based on a model. The model may include a logical entity associated with a variable. The system may further be configured to identify a boundary for the variable based on a code section of the code corresponding to the logical entity and add alignment code to the code. The alignment code may be for the variable and based on the boundary.

29 Claims, 12 Drawing Sheets

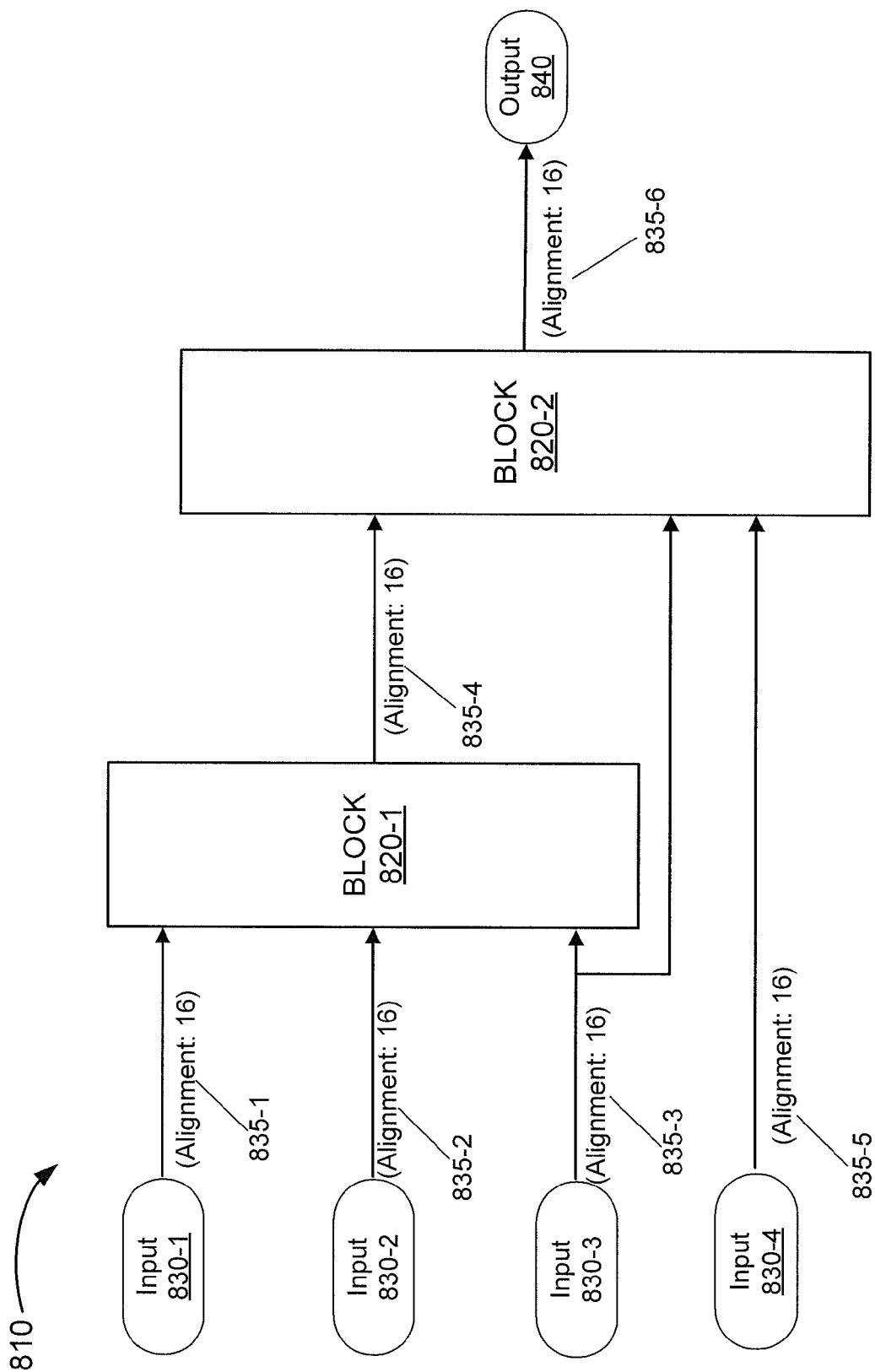

MODEL-BASED VARIABLE ALIGNMENT IN A SIMULATED ENVIRONMENT

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 8A-8C are block diagrams illustrating an example solution for propagating alignment boundaries of variables throughout a model;

DETAILED DESCRIPTION

Figure 1:
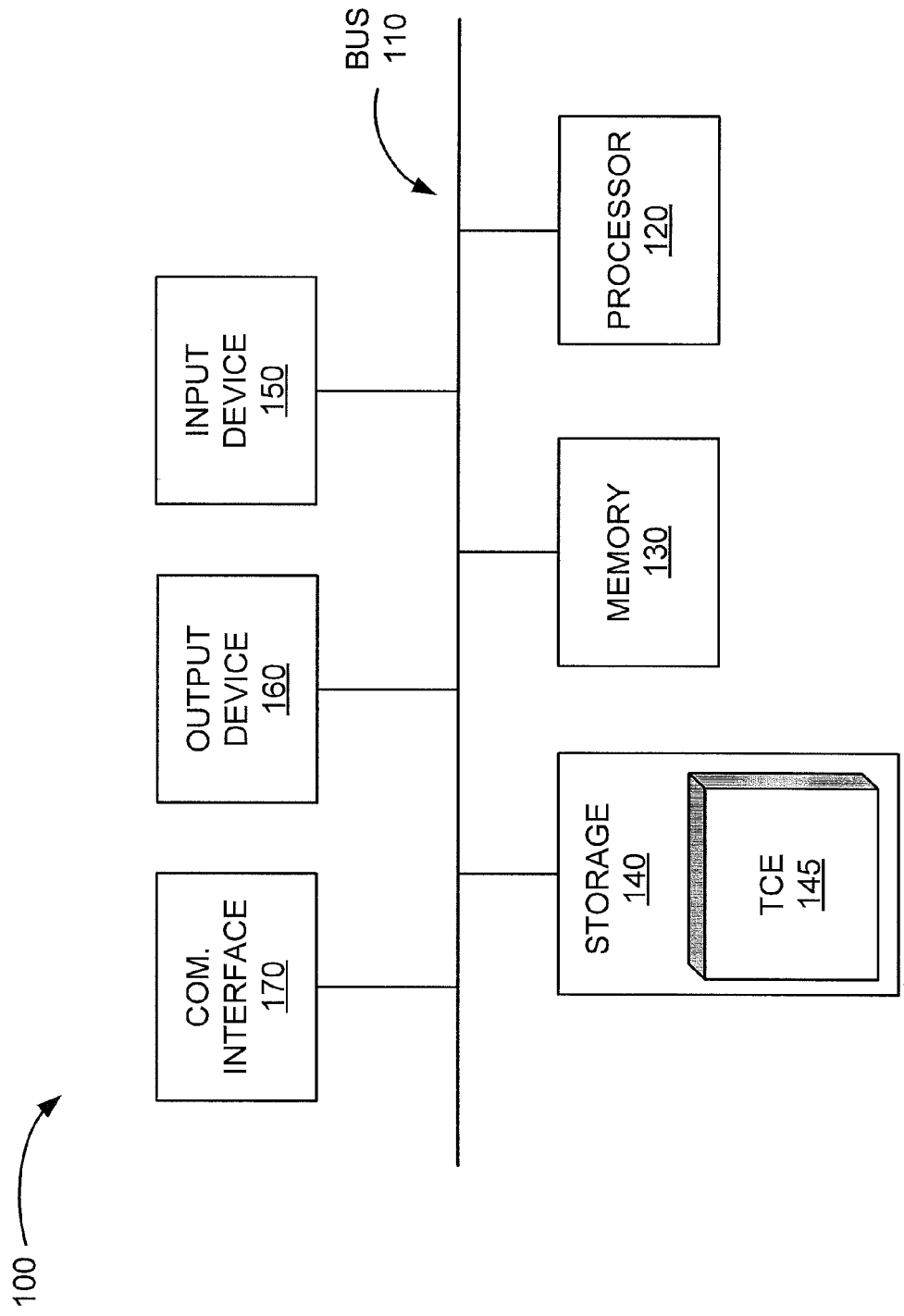
FIG. 1 is a diagram of an example of a computing device that may implement one or more embodiments of the invention.

The following detailed description refers to the accompanying drawings. The same reference numbers in different drawings may identify the same or similar elements.

An instruction may refer to, for example, a function, a procedure, a method, a routine, a subroutine, or a code section. Furthermore, a variable may refer to, for example, a data object, a parameter, a vector, a scalar, a matrix, an input signal, or an output signal.

A technical computing environment (TCE) may provide an environment, which may enable a user to simulate systems, perform advanced analysis, visualize data, develop algorithms, etc. The TCE may be a graphical-based modeling environment, a textual-based modeling environment, and/or a hybrid modeling environment (e.g., a combination of graphical and textual modeling environments).

A model may refer to a graphical model, a block diagram model, a textual model, or some other type of model. A model may represent a physical system in a TCE. A model may include one or more logical entities that may model different components of the physical system. Logical entities may refer to, for example, blocks of a block diagram model or textual statements of a textual model. Moreover, the logical entities may be associated with one or more variables. These variables may be associated with input signals, output signals, and/or internal variables. Internal variables may be internal to the logical entities. Internal variables may include, for example, internal algebraic variables and/or internal state variables. For example, a block diagram model may be built by placing blocks, which may represent functionality and/or data associated with the physical system, onto a canvas and interconnecting the blocks.

Execution of a model may include, for example, executing and/or interpreting code corresponding to one or more logical entities of the model, according to semantics of a TCE being utilized to execute the model. The code may include an instruction that specifies an alignment requirement. For example, a block, in a block diagram model, may be represented by a code section that is part of the code corresponding to the model. The code section may include one or more instructions. The instructions may specify alignment requirements that are required to be met for the instructions to be invoked when the code is executed.

An alignment requirement may specify that variables in the code be aligned on a particular boundary (e.g., a 16-byte alignment boundary). An alignment of a variable may occur, for example, during compilation when memory is allocated for the variable. When the variable is aligned based on the particular boundary, a memory address of the variable may be divisible by a value (e.g., 16) of the particular boundary.

Overview

An embodiment may automatically align variables associated with a model. The model may include one or more blocks. A block may be associated with one or more variables, which may represent one or more input signals and/or output signals of the block. A TCE may identify a boundary for a variable, based on a source code section associated with the block. The TCE may generate alignment code, for the variable, based on the identified boundary. The TCE may add the alignment code to code associated with the model. During a compilation of the code, the TCE may align the variable based on the alignment code.

Example Components of a Device

FIG. 1 is a diagram of example components of a device 100 that may implement embodiments described below. Device 100 may be a computational device. For example, device 100 may be a server, a workstation, a mainframe, a desktop computer, a laptop computer, a smart phone, a tablet computer, and/or some other type of computational device.

Referring to FIG. 1, device 100 may include, among other things, a bus 110, a processor 110, a memory 130, storage 140, an input device 150, an output device 160, and/or a communication interface 170. In other implementations, device 100 may include fewer components, additional components, different components, and/or a different arrangement of components than those depicted in FIG. 1.

Bus 110 may permit communication between components of device 100. Bus 110 may include a system bus, an address bus, a data bus, and/or a control bus. Bus 110 may also include bus drivers, bus arbiters, bus interfaces, and/or clocks.

Processor 110 may interpret and/or execute instructions. For example, processor 110 may include one or more general-purpose processors, microprocessors, data processors, graphical processing units (GPUs), co-processors, network processors, application specific integrated circuits (ASICs), application specific instruction-set processors (ASIPs), system-on-chip (SOCs), controllers, programmable logic devices (PLDs), chipsets, and/or field programmable gate arrays (FPGAs).

Memory 130 may be a non-transitory tangible computer-readable storage medium that may store data and/or instructions related to an operation and use of device 100. For example, memory 130 may store data and/or instructions that may implement one or more embodiments described herein. Memory 130 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 140 may include a non-transitory tangible computer-readable storage medium that may store data and/or software related to operation and use of device 100. For example, storage 140 may include a hard disk (e.g., a magnetic disk, an optical disk, a magneto-optic disk, a solid state disk), a floppy disk, a cartridge, a magnetic tape, and/or other types of non-transitory tangible computer-readable storage mediums. Moreover, storage 140 may include a drive that may hold the medium. For example, storage 140 may include a compact disc and a compact disk drive that may be used to read/write the compact disc.

It should be noted that a computer-readable medium is intended to be broadly interpreted to include a memory, storage, or other computer-readable mediums. A computer-readable medium may be tangible and may be implemented in a single device, in multiple devices, in a centralized manner, or in a distributed manner. A computer-readable medium may correspond to, for example, a physical device or a logical device that may store computer-executable instructions for performing one or more activities on a computing device and/or that may store data that may be manipulated by a computing device. A logical device may be a device that may include storage within a single physical device or storage that may be spread across multiple physical devices. Examples of logical devices may include, but are not limited to, virtual drives and virtual memory. The computer-readable medium may store data and/or instructions that may implement one or more embodiments of the invention.

Memory 130 and/or storage 140 may also include a storing device external to and/or removable from device 100, such as a Universal Serial Bus (USB) memory stick, a hard disk, network storage, or other storage devices. In an embodiment, storage 140 may store TCE 145.

TCE 145 may include hardware-based logic and/or a combination of hardware and software-based logic that provides a computing environment. The computing environment may permit a user to perform tasks related to disciplines, such as, but not limited to, mathematics, science, engineering, medicine, and/or business.

TCE 145 may include a dynamically typed language (e.g., a dynamically typed programming language) and/or an array-based language that may be used to express problems and/or solutions in mathematical notations. For example, problems and/or solutions may be represented as matrix and/or vector formulations that may be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, and/or state based analysis and/or design.

TCE 145 may further provide mathematical functions and/or graphical tools (e.g., for creating plots, surfaces, images, volumetric representations). In an embodiment, TCE 145 may provide these functions and/or graphical tools using toolboxes (e.g., toolboxes for signal processing, image processing, data plotting, parallel processing, etc.). In other embodiments, TCE 145 may provide these functions as block sets. In still other embodiments, TCE 145 may provide these functions in another way, such as via a library.

TCE 145 may provide one or more environments for modeling a system using the model. For example, TCE 145 may include a graphical-based environment, a textual-based environment, and/or a hybrid environment (e.g., a combination of graphical and textual environments). TCE 145 may connect, access, and/or interface with other software applications, data, devices, and/or other types of resources during a modeling process. Concepts described herein are not dependent upon and/or are limited to a particular type of TCE.

Examples of TCEs that may be modified to incorporate one or more embodiments of the invention include, but are not limited to, the MATLAB®, Simulink®, Stateflow®, Simscape™, and SimEvents®, software applications which are available from The MathWorks, Inc., Natick, Mass.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica and Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; the Eclipse development platform from the Eclipse Foundation; MagicDraw from No Magic, Inc.; CoWare from CoWare, Inc.; and Ptolemy from the University of California at Berkeley.

Input device 150 may permit information to be input into device 100. Input device 150 may include, for example, a keyboard, a keypad, a mouse, a display (e.g., a touch screen), a button, a switch, a microphone, voice recognition logic, a gyroscope, an accelerometer, a global positioning system (GPS), an input port, and/or some other type of input device. Output device 160 may permit information to be output from device 100. Output device 160 may include, for example, a display, a speaker, one or more light emitting diodes (LEDs), an output port, and/or some other output device.

Communication interface 170 may permit device 100 to communicate with other devices, networks (e.g., a local area network, wide area network, the Internet, etc.), and/or systems. Communication interface 170 may include a transceiver-like component that enables communication with the other devices. Examples of communication interface 170 may include a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the device 100 to the network.

As will be described in detail below, device 100 may perform certain acts relating to embodiments described herein. Device 100 may perform these acts in response to processor 120 executing software instructions contained in a computer-readable medium, such as memory 130 and/or storage 140.

The software instructions may be read into memory 130 from another computer-readable medium, such as storage 140, or from another device via communication interface 170. The software instructions contained in memory 130 may cause processor 120 to perform acts described herein. Alternatively, hardwired circuitry may be used in place of or in combination with software instructions to implement acts described herein. Thus, embodiments described herein are not limited to any specific combination of hardware circuitry and software.

Example Technical Computing Environment

Figure 2:
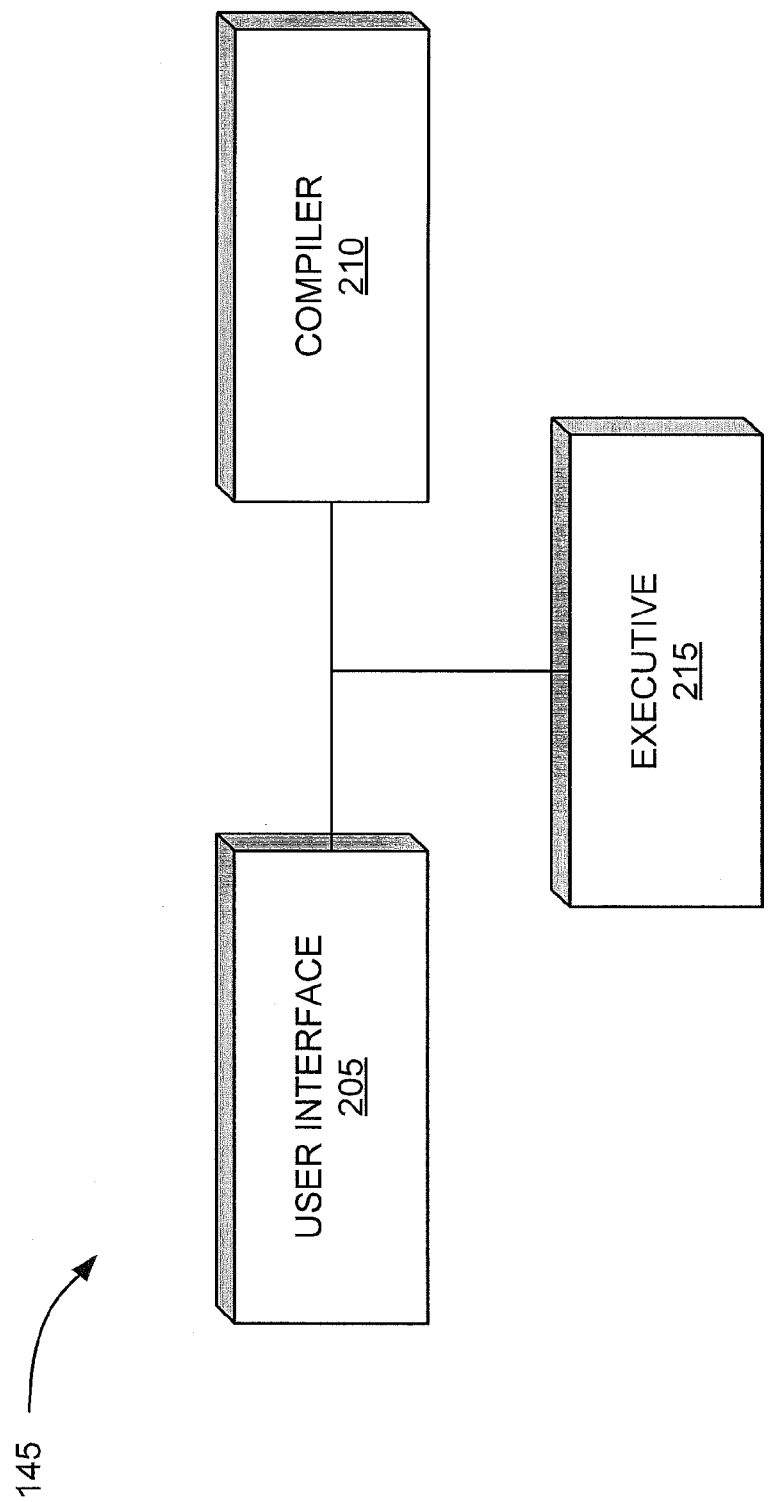
FIG. 2 is a diagram illustrating an example of a technical computing environment (TCE)

FIG. 2 is a diagram illustrating example functional components of TCE 145. TCE 145 may include, for example, a user interface 205, a compiler 210, and an executive 215. In other implementations, TCE 145 may include fewer functional components, additional functional components, different functional components, and/or a different arrangement of functional components than those illustrated in FIG. 2. The functional components described in connection with FIG. 2 may be implemented by one or more of the components of device 100.

TCE 145 may include a user interface 205 that may provide one or more interfaces for creating, compiling, executing, analyzing, and/or validating a model of a system. User interface 205 may also provide libraries that include predefined logical entities that may be used to create the model. Additionally, or alternatively, user interface 205 may permit user-defined logical entities (e.g., blocks, sub-systems) to be created and used for creating the model.

Compiler 210 may include logic for transforming information associated with a model to an alternative form. For example, compiler 210 may be used to convert a graphical description of the model, which may be embodied by a block diagram of the model, into an internal representation. Compiler 210 may generate code (e.g., executable code, target code, intermediate code) from the internal representation.

The code may be generated in a programming language (e.g. C/C++, JAVA, SystemC), which may be further compiled and linked into an executable program. Moreover, the code may be generated in a hardware description language (e.g., HDL, Verilog, VHDL), which may be used to synthesize custom hardware.

Compiler 210 may perform various operations to generate the code. For example, compiler 210 may prepare data structures, evaluate parameters, configure and infer (e.g., by propagating) entity characteristics (e.g., sample time, data type, complexity, dimension), determine entity connectivity, determine signal compatibility, or other operations that may be associated with generating code.

While generating code, compiler 210 may identify an alignment boundary for a variable in the code. Compiler 210 may generate alignment code for the variable based on the identified alignment boundary. This alignment code may be included in the generated code. Compiler 210 may generate code that allocates space in memory for the variable based on the alignment code. Here, a memory address of the variable may be divisible by a value of the alignment boundary.

A model may use an array-based language. Variables associated with the model may be organized as arrays representing dynamic data structures in the model. These dynamic data structures may increase in size during the execution of the model when new elements are added to the arrays. Examples of dynamic data structures may include heterogeneous array containers (e.g., heterogeneous array, cell array, etc.), dynamic structures, matrices, etc. A heterogeneous array container may include multiple elements corresponding to data objects of different types. For example, a heterogeneous array may include/store a first element, a second element, and a third element. The first element may include a heterogeneous array. The second element may include a value (e.g., integer, character, string). The third element may include a dynamic structure. A dynamic structure may include one or more fields that store variables and/or other data objects of different types (e.g., a heterogeneous array, an integer, a character, a string, an array, etc.).

Code generated by compiler 210 may be in an executable form. An executable form may include, for example, executable code (e.g., machine code) that may be executed on a device, such as device 100. The executable code may be in the form of an executable image, object code, a library, and/or some other form. Moreover, an executable form may include code that may not be directly executable on a device. For example, the executable code may include code (e.g., p-code) that may be interpreted by an interpreter that may execute on the device. Code contained in the executable form may be targeted for a specific platform (e.g., processor, interpreter). Further, compiler 210 may contain provisions to enable a user to choose the targeted platform.

Executive 215 may include logic for executing code generated by compiler 210. One or more results of executing, running, and/or simulating the code may be output by executive 215.

In an embodiment, TCE 145 may import and/or access a stored model that was created in, for example, an environment other than TCE 145. The imported and/or stored model may be compiled and executed using TCE 145.

Example Model

Figure 3:
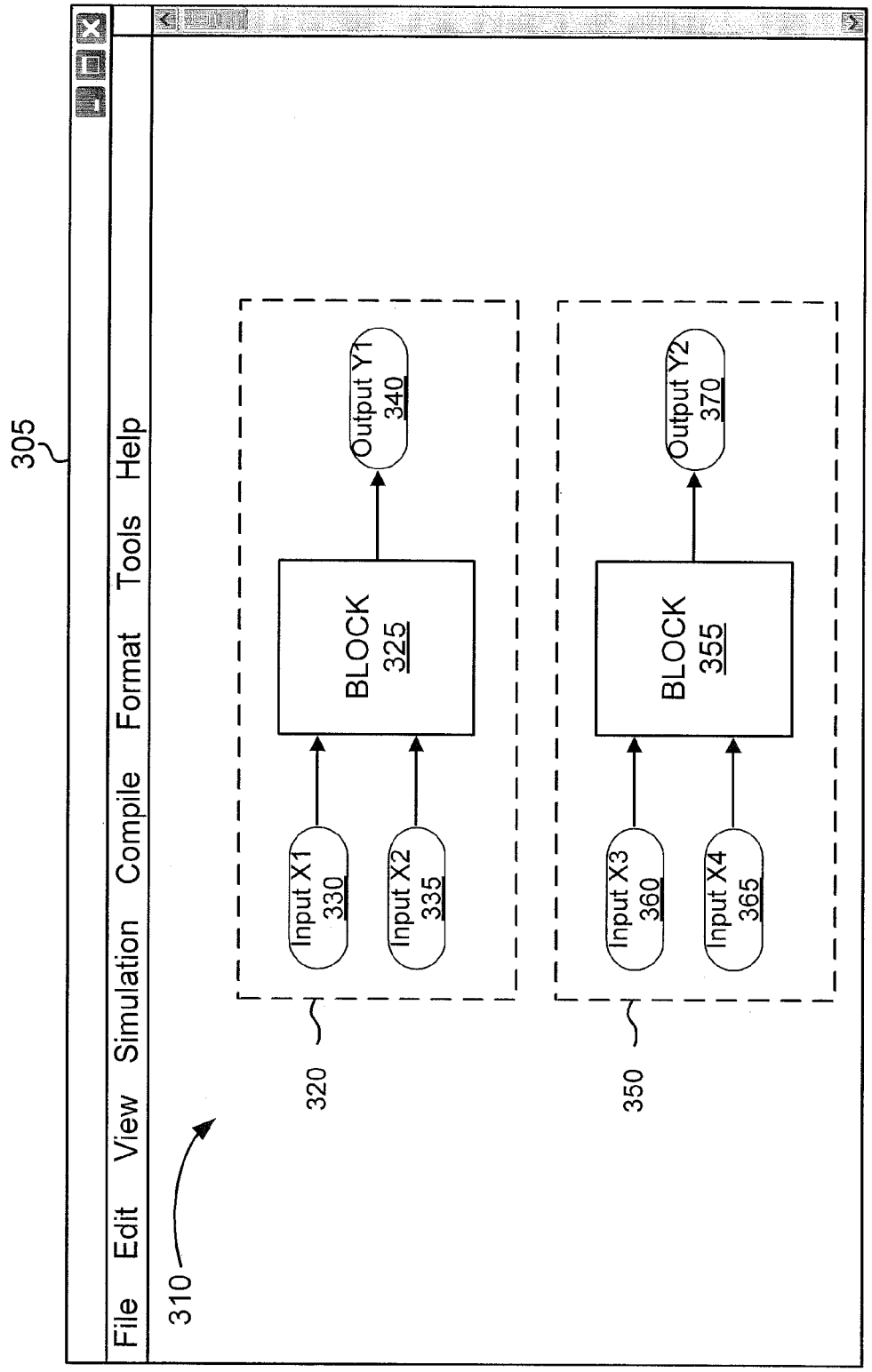
FIG. 3 is a diagram illustrating an example model in an example graphical user interface (GUI)

FIG. 3 is a diagram illustrating an example model 310 in an example graphical user interface (GUI) 305. User interface 205 may provide GUI 305 in which a user may create model 310. Model 310 may include a grouping 320 and a grouping 350. Each grouping may refer to a block and to input and output signals associated with the block. Each one of the input signals and the output signals may correspond to or include a variable.

As shown, grouping 320 may include a block 325. Block 325 may receive an input signal X1 330 and an input signal X2 335. Block 325 may provide an output signal Y1 340. Block 325 may be associated with a first code section having a first alignment requirement. Grouping 350 may include a block 355. Block 355 may receive an input signal X3 360 and an input signal X4 365. Block 355 may provide an output signal Y2 370. Block 355 may be associated with a second code section having a second alignment requirement (or no alignment requirement). In some situations, the first and second alignment requirements may be different. The number of blocks provided is simply for explanatory purposes. In particular, model 310 may include more blocks than shown.

Example Code

Figure 4:
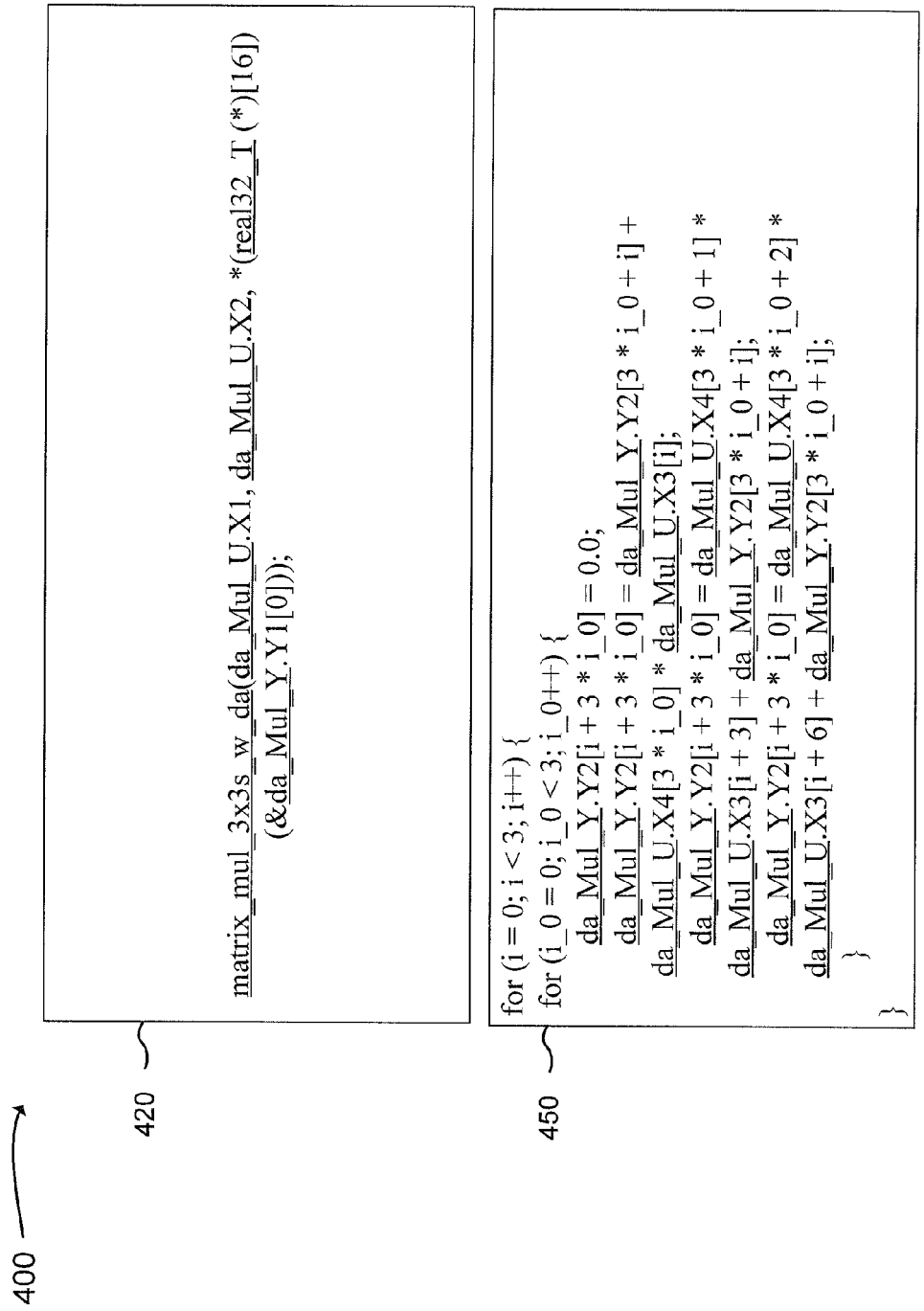
FIG. 4 is a diagram of example code that may associated with the model of FIG. 3.

FIG. 4 is a diagram of example code 400 that may be associated with model 310. As shown, code 400 may include code section 420 and code section 450.

Code section 420 may correspond to block 325. As shown, code section 420 may include an instruction, function "matrix_mul_3×3s_w_da" (the function), associated with variables input X1, input X2, and output Y1. The function may receive input X1 and input X2. The function may determine the value of output Y1 based on input X1 and input X2.

To do so, the function may invoke, for example, single instruction, multiple data (SIMD) operations. The SIMD operations may specify an alignment requirement that must be met by input X1, input X2, and output Y1 in order to invoke the SIMD operations. For example, the alignment requirement may indicate that the SIMD operations only operate on 16-byte aligned data. In other words, input X1, input X2, and output Y1 have to be aligned based on a 16-byte boundary to properly process code section 420 by invoking the SIMD operations.

Code section 450 may correspond to block 355. As shown, code section 450 may only use input X3 and input X4 in basic mathematical operations to determine output Y2. Code section 450 may not invoke any instructions that only operate on aligned data. As a result, there may be no alignment requirements for variables associated with grouping 350 (i.e., input X3, input X4, and output Y2). In other words, the variables do not have to be aligned to properly process code section 450.

Example Processes

Figure 5:
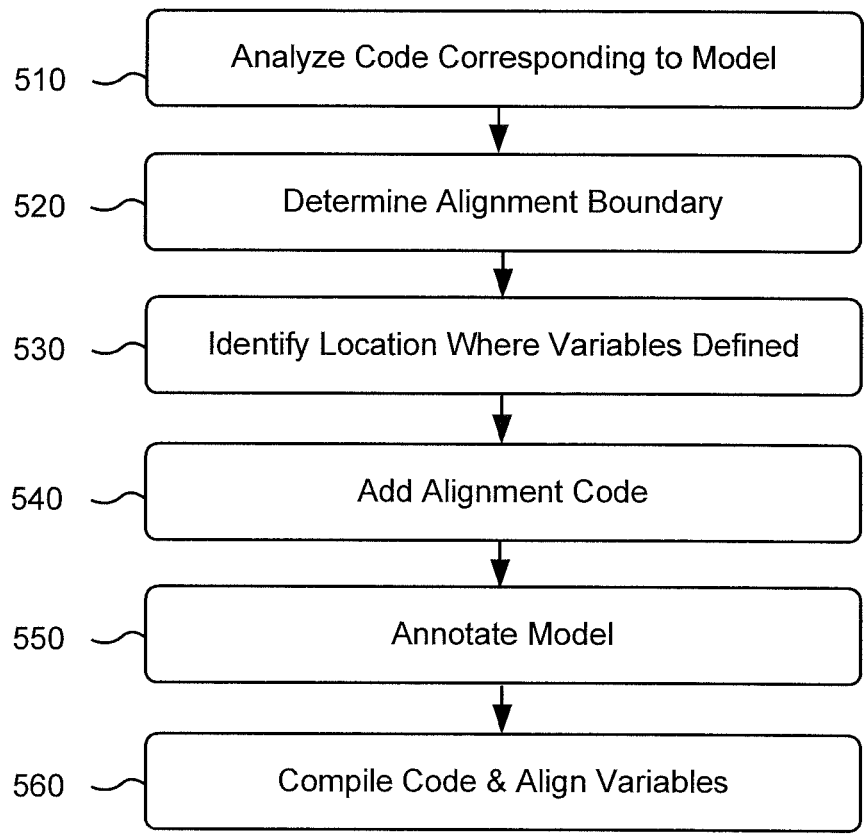
FIG. 5 is a flowchart of an example process for aligning variables.

FIG. 5 is a flowchart of an example process 500 for aligning variables. TCE 145 may perform process 500. Process 500 is described with reference to model 310 of FIG. 3 and with reference to code section 420 and code section 450 of FIG. 4.

Process 500 may include analyzing code corresponding to model 310 (block 510). For example, the code may be manually entered, generated based on model 310, and/or retrieved from a storage location. The code may include code sections 420 and 450. TCE 145 may identify, in code section 420, an instruction, for example, the function "matrix_mul_3× 3s_w_da." TCE 145 may determine that the function includes other instructions that may only be invoked if input X1, input X2, and output Y1 are aligned. As a result, TCE 145 may determine that input X1, input X2, and output Y1 are to be aligned. TCE 145 may determine that instructions of code section 450 do not operate only on aligned variables. Accordingly, TCE 145 may not determine that input X3, input X4, and output Y2 are to be aligned.

Process 500 may also include determining an alignment boundary for variable(s) (block 520). For example, TCE 145 may determine an alignment boundary for variables that are to be aligned (e.g., input X1, input X2, and output Y1) based on alignment information, alignment constraint(s) specified by the user, and/or target information. The alignment information may include an 8-byte alignment requirement (or other alignment requirements) specified by the instructions invoked in code section 420. The alignment constraints may include user-specified information regarding how variables associated with blocks or sub-blocks of model 310 should be aligned. For example, one of the alignment constraints may require at least a 16-byte alignment boundary for any variable being aligned based on an 8-byte alignment requirement.

Target information may include one or more of compiler information, processor information, register structure information (e.g., register size), cache structure information (e.g., cache levels, cache size, cache alignment, etc.), page size, memory information, etc. TCE 145 may use one or more rules for factoring in the target information to determine the alignment boundary. For example, one of the rules may require at least a 4-byte alignment of variables when the cache size is greater than a predefined value. In connection with code section 420, TCE 145 may determine a 16-byte alignment boundary for the variables, input X1, input X2, and output Y1.

Process 500 may also include identifying locations where the variables are defined (block 530). For example, to identify these locations for each one of the variables, TCE 145 may trace down to a code section where the variable to be aligned is used. TCE 145 may trace back up, from the code section, to identify a location where the variable is defined. In another embodiment, TCE 145 may identify locations for two or more variables at the same time. The identified locations may include a location before a location where each one of the variables (e.g., input X1, input X2, and output Y1) is defined.

Process 500 may also include adding alignment code (block 540). In one embodiment, for example, TCE 145 may generate the alignment code, based on the 16-byte alignment boundary, for the variables that are to be aligned. TCE 145 may insert the alignment code (e.g., shown as "_declspec (align(16))") into the generated code for model 310 as follows:

/*Definition of Inputs (Inputs X1, X2, X3, X4*/
_declspec(align (16)) real_T X1[9];
_declspec(align (16)) real_T X2[9];
real_T X3[9];
real_T X4[9];
/* Definition of Outputs (Outputs Y1, Y2)*/
_declspec(align(16)) real_T Y1[9];
real_T Y2[9];

In another embodiment, one or more of the identified locations where the variables are defined may already include the alignment code as part of a comment (e.g., /* _declspec (align(16))*/). TCE 145 may add the alignment code by removing delimits (e.g., "/*" and "*/") that surround the alignment code. In yet another embodiment, one or more of the locations where the variables are defined may include an alignment code that specifies an incorrect value for the alignment boundary (e.g., _declspec(align(4))). TCE 145 may update the alignment code by replacing the incorrect value (e.g., 4) with a proper value (e.g., 16) of the alignment boundary.

Process 500 may also include annotating a model (block 550). For example, TCE 145 may annotate model 310 to indicate the 16-byte alignment boundary. TCE 145 may annotate model 310 by adding alignment indicators (e.g., (Alignment: 16)) in proximity with input signal X1 330, input signal X2 335, and output signal Y1 340. At later points in time, TCE 145 may also annotate model 310 to indicate that the alignment code was added into the code generated for model 310 and/or to indicate that variables were aligned based on the alignment boundaries.

In another embodiment, in response to the annotation of model 310, the user may make modifications to model 310, to the code generated based on model 310, and/or to the alignment constraints specified by the user. TCE 145 may repeat process 500 after the user makes the modifications.

In yet another embodiment, TCE 145 may track where the alignment code for a variable is located in the generated code and/or where an indicator associated with the variable is annotated in model 310. When TCE 145 detects a change in the alignment code for the variable, TCE 145 may automatically adjust the indicator to reflect the change in the alignment code. For example, a user may change the alignment boundary, for a variable, from a 16-byte alignment boundary to a 64-byte alignment boundary by changing the alignment code. In response, TCE 145 may automatically change an indicator, which is associated with the variable, from (Alignment: 16) to (Alignment: 64).

Process 500 may also include compiling code and aligning variables (block 560). For example, TCE 145 may compile the generated code after the alignment code is added to the generated code. During compiling, TCE 145 may allocate memory for each one of the variables defined in the code. TCE 145 may, for example, allocate 16-bytes (or a multiple of 16-bytes) for each variable whose definition is preceded by alignment code that specifies a 16-byte alignment boundary (e.g., _declspec(align(16))). In this instance, the address of each of the aligned variables may be divisible by 16. In another embodiment, TCE 145 may transmit the generated code to another computing environment. The other computing environment may compile the generated code and align the variables based on the alignment code. After the code is compiled, TCE 145 or another computing environment may execute the compiled code.

Figure 6:
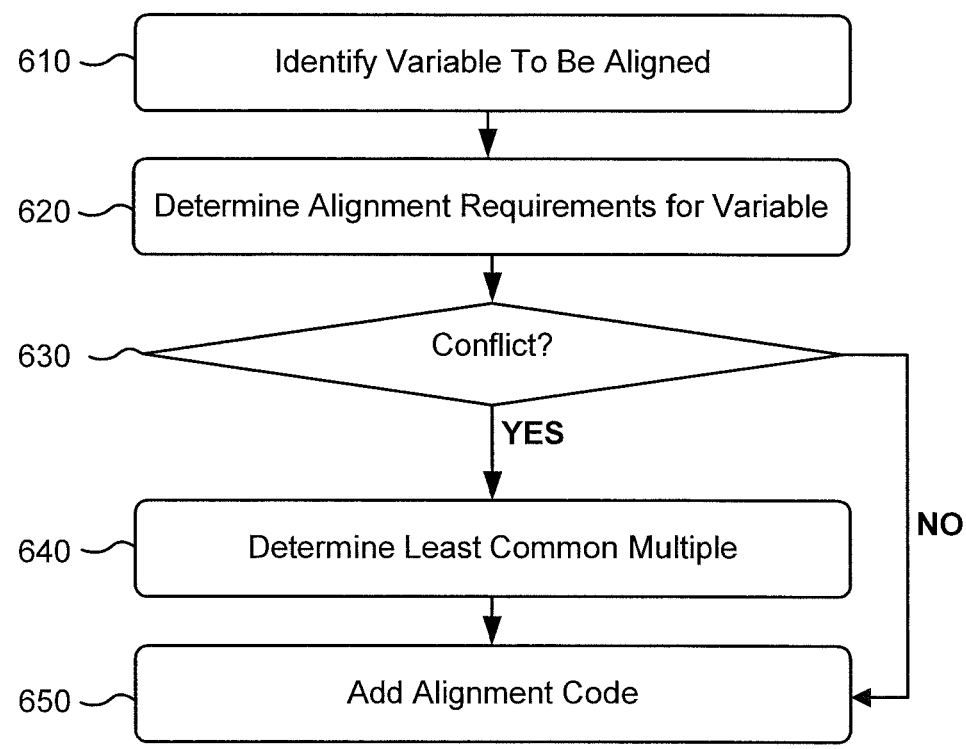
FIG. 6 is a flowchart of an example process for resolving a conflict when a variable is associated with different alignment requirements.

FIG. 6 is a flowchart of an example process 600 for resolving a conflict when a variable is associated with different alignment requirements. TCE 145 may perform process 600. For example, a model may include multiple logical entities associated with a variable. One or more of the logical entities may invoke instructions that specify different alignment requirements for the variable. In the description of process 600 below, a variable may refer to multiple variables that are associated with alignment requirements via the same logical entities.

Process 600 may include identifying a variable to be aligned (block 610). For example, a model may represent a system. TCE 145 may receive, generate, and/or retrieve code corresponding to the model. The code may include code sections. The code sections may include instructions. TCE 145 may determine whether any of the instructions specify alignment requirements for the variable (i.e., require the variable to be aligned in order to invoke the instructions). If so, TCE may identify the variable as the variable to be aligned.

Process 600 may also include determining alignment requirements for the variable (block 620). For example, assume TCE 145 determines that a first code section, of the code of the model, invokes an instruction (e.g., a SIMD operation) that specifies a 16-byte alignment requirement for a particular variable. Assume further that TCE 145 also determines that a second code section, of the code, invokes a different instruction (e.g., a memory copy function) that specifies a 128-byte alignment requirement for the same variable. In this manner, TCE 145 may determine all the alignment requirements for the variable based on the code sections associated with the model.

Process 600 may include determining whether a conflict exists between the alignment requirements for the variable (block 630). For example, TCE 145 may compare alignment requirements for a variable to determine whether any of the alignment requirements are different from one another. TCE 145 may determine that no conflict exists if all the alignment requirements for the variable are the same. TCE 145 may determine that a conflict exists when any one of the alignment requirements, for the variable, is different from any other one of the alignment requirements. In the example above, TCE 145 may determine that a conflict exists because the variable is associated with both a 16-byte alignment requirement and a 128-byte alignment requirement, which are different from one another.

If a conflict exists between the alignment requirements for the variable (block 630-YES), process 600 may include determining a least common multiple (LCM) (block 640). For example, TCE 145 may analyze the different alignment requirements, for the variable, to determine the LCM. In the example above, TCE 145 may determine that the LCM of the 16-byte alignment requirement and the 128-byte alignment requirement is 128 because 128 is evenly divisible by both 128 and 16. TCE 145 may assign the LCM as an alignment boundary for the variable. Accordingly, TCE 145 may assign a 128-byte alignment boundary for the variable. If a conflict does not exist between the alignment requirements for the variable (block 630—NO), TCE 145 may assign a value of the alignment requirements (e.g., 16) for an alignment boundary of the variable (e.g., 16-byte alignment boundary).

Process 600 may also include adding alignment code (block 650). As discussed above with respect to blocks 530 and 540 (FIG. 5), TCE 145 may add alignment code at a location, in the code, that precedes the location where the variable is defined. In the example above, TCE 145 may generate alignment code (e.g., _declspec (align(128))) based on the 128-byte alignment boundary when the conflict exists. TCE 145 may add the alignment code at a location, in the code, where the particular variable is defined.

Process 600 may continue as described above with respect to blocks 550 and 560 (FIG. 5). In the example above, TCE 145 may annotate the model by adding an alignment indicator, (Alignment: 128), to the model. TCE 145 may also allocate, during the compiling of the generated code, 128-bytes (or a multiple of 128-bytes) in the memory for the variable based on the alignment code.

Figure 7:
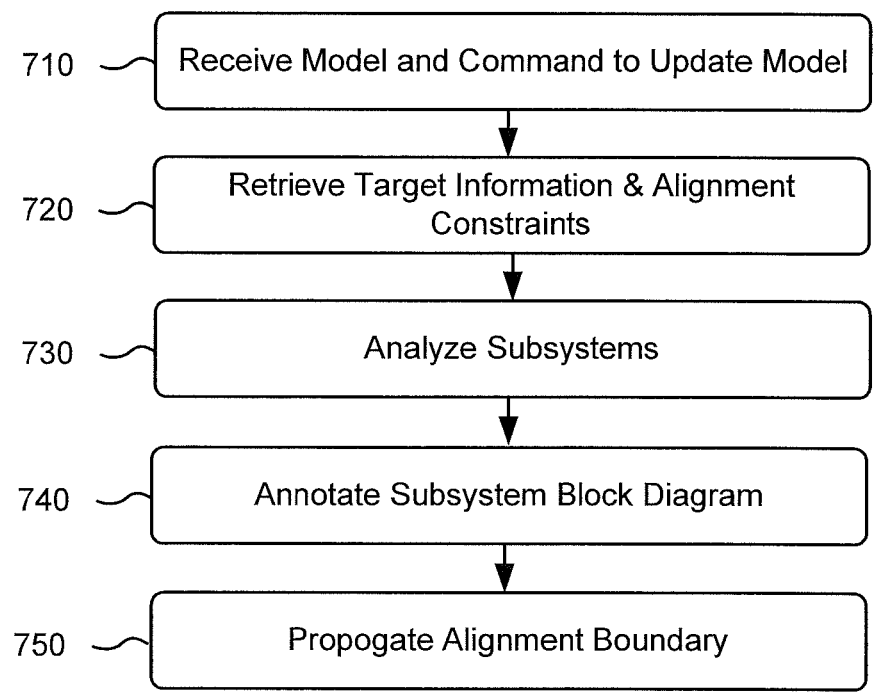
FIG. 7 is a flowchart of an example process for propagating alignment boundaries of variables throughout a model.
Figure 8A:
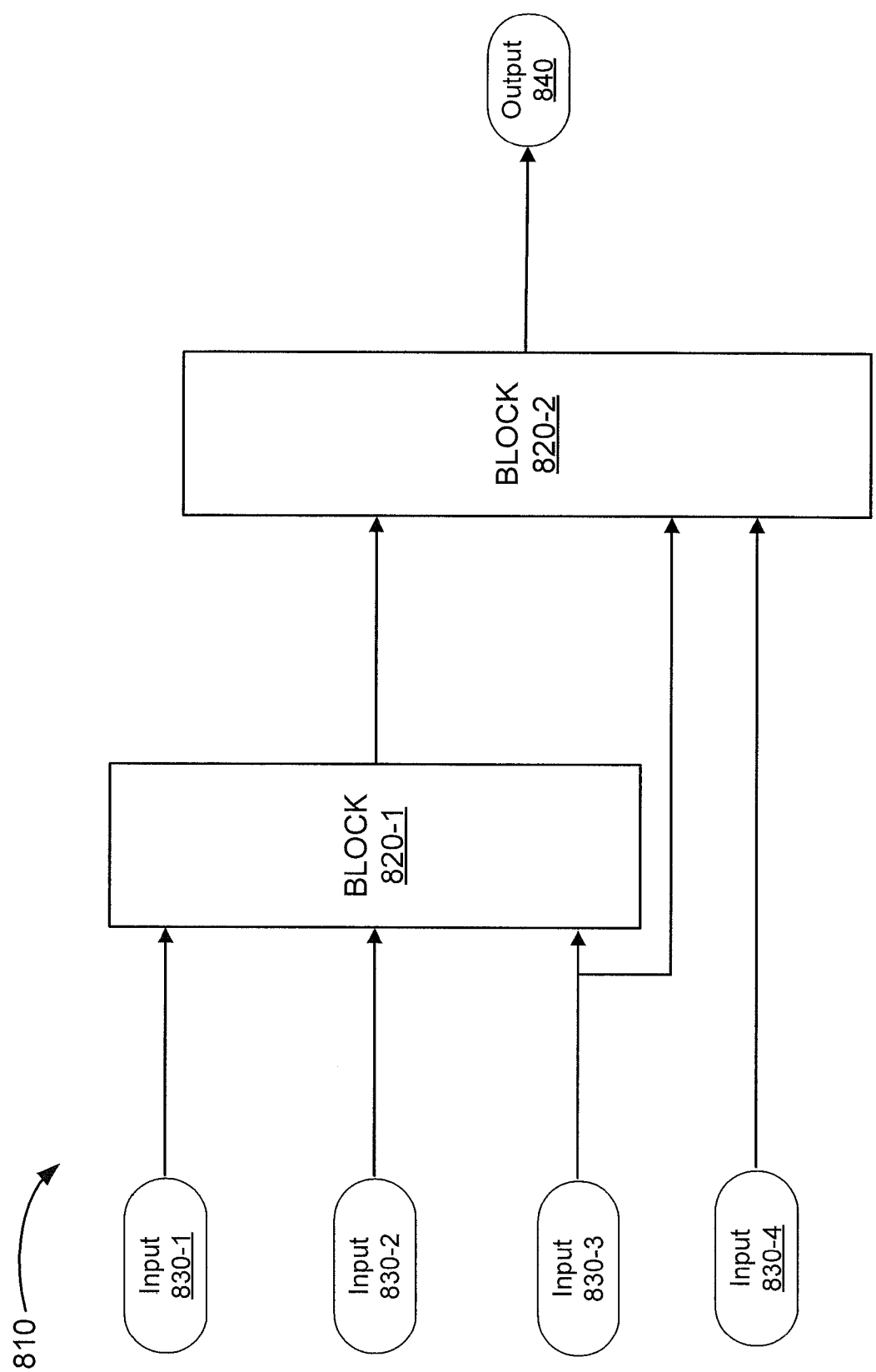
Figure 8B:
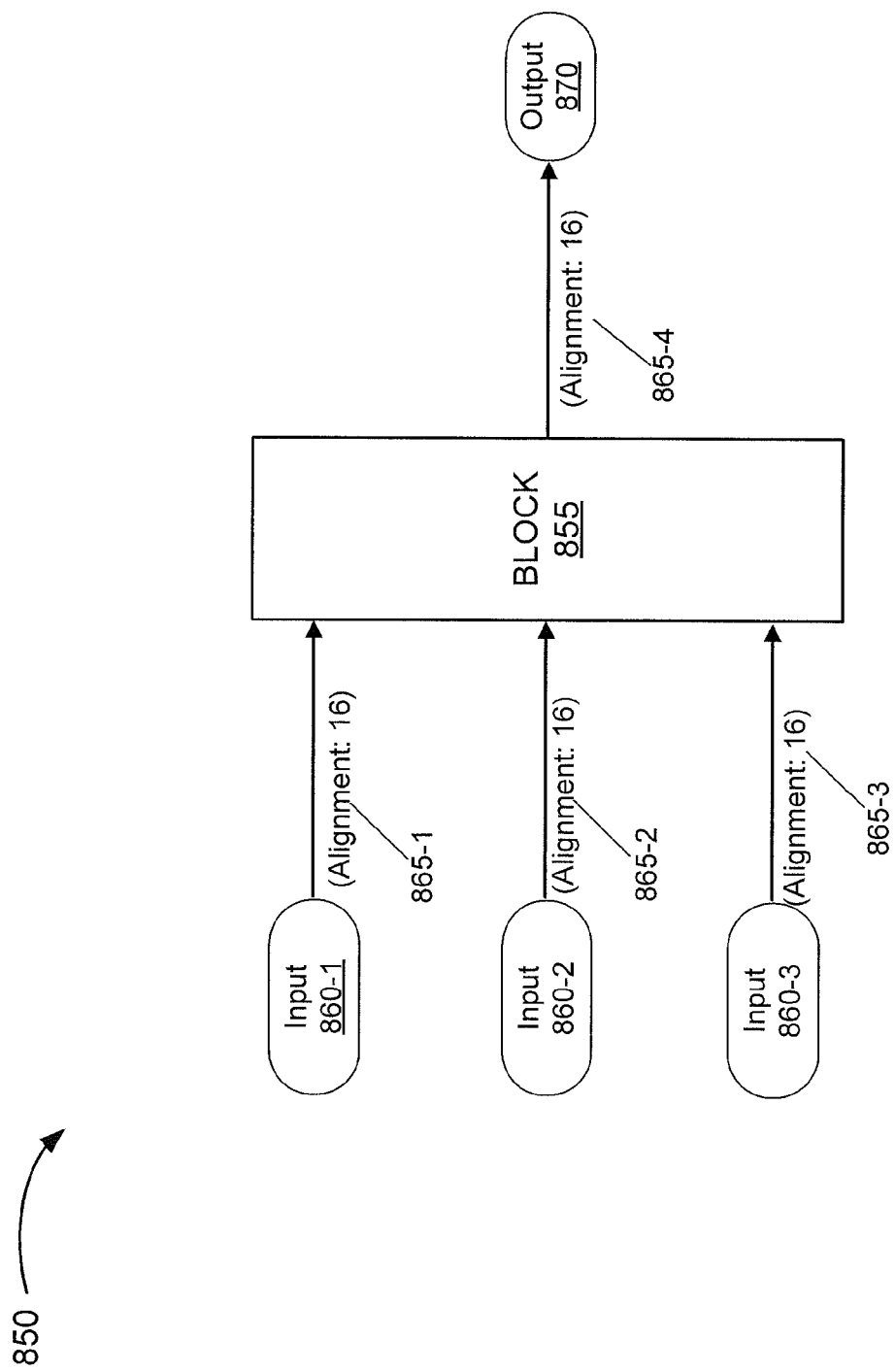

FIG. 7 is a flowchart of an example process 700 for propagating alignment boundaries of variables throughout a model. TCE 145 may perform process 700. Process 700 will be described with reference to FIG. 8A-8C. FIG. 8A-8C are block diagrams illustrating an example solution for propagating alignment boundaries of variables throughout a model. FIG. 8A illustrates a model 810 of a system being modeled. FIG. 8B illustrates a subsystem block diagram 850 of model 810.

Process 700 may include receiving a model (block 710). For example, TCE 145 may receive model 810 when a user creates model 810 or from a storage location that stores previously created models. Model 810 may include a block 820-1 and a block 820-2. Block 820-1 may receive an input signal 830-1, an input signal 830-2, and an input signal 830-3. Block 820-1 may determine an output signal based on one or more of input signal 830-1, input signal 830-2, or input signal 830-3. Block 820-2 may receive the output signal of block 820-1, input signal 830-3, and an input signal 830-4. Block 820-2 may determine an output signal 840 based on one or more of the output signal of block 820-1, input signal 830-3, or input signal 830-4.

Thereafter, TCE 145 may receive a command from the user to update model 810 (block 710). The user may utilize device 100 to enter a command to prompt TCE 145 to update model 810. In response to the command, TCE 145 may continue process 700, as described further below.

Process 700 may further include retrieving target information and alignment constraints (block 720). For example, in response to the command to update model 810, in one embodiment, TCE 145 may retrieve the target information and the alignment constraints from storage of device 100. In another embodiment, TCE 145 may request one or more user-provided pieces of the target information and/or the alignment constraints after receiving the command to update model 810. In yet another embodiment, TCE 145 may determine the target information based on the architecture of device 100 and/or based on functional components of TCE 145. The target information may include, for example, compiler information of a compiler for compiling code associated with model 810, processor information of a processor for executing model 810 and/or the code, register structure information, cache structure information, and/or memory information (e.g., memory size) associated with device 100.

Process 700 may also include analyzing subsystems of model 810 to determine alignment boundaries for variables (block 730). Assume that TCE 145 determines that block 820-1 includes a particular subsystem, which is shown as subsystem block diagram 850 in FIG. 8B. Subsystem block diagram 850 may include a block 855. Block 855 may receive an input signal 860-1, an input signal 860-2, and an input signal 860-3. Block 855 may provide an output signal 870 based on one or more of input signal 860-1, input signal 860-2, or input signal 860-3.

TCE 145 may retrieve subsystem block diagram 850. TCE 145 may analyze subsystem block diagram 850 to determine alignment boundaries (if any) for input signal 860-1, input signal 860-2, and/or input signal 860-3. One or more of input signal 860-1, input signal 860-2, input signal 860-3, and/or output signal 870 may be annotated with alignment information when block diagram 850 is retrieved. The alignment information may represent alignment requirements. TCE 145 may determine, for example, a 16-byte alignment boundary for input signal 860-1, input signal 860-2, input signal 860-3, and/or output signal 870 based on the alignment information, the target information, and/or the alignment constraints.

Process 700 may also include annotating subsystem block diagram 850 (block 740). For example, after determining the alignment boundary for inputs signals 860-1, 860-2, and 860-3, TCE 145 may annotate block diagram 850, based on the alignment boundary. TCE 145 may add, to subsystem block diagram 850, an indicator 865-1 (e.g., (Alignment: 16)) for input 860-1, an indicator 865-2 (e.g., (Alignment: 16)) for input signal 860-2, and an indicator 865-3 (e.g., (Alignment: 16)) for input signal 860-3. Indicator 865-1 (e.g., (Alignment: 16)) may show a 16-byte alignment requirement or boundary for input signal 860-1. TCE 145 may further propagate the alignment boundary to other variables of subsystem block diagram 850. For example, as further shown in FIG. 8B, TCE 145 may add an indicator 865-4 (e.g., (Alignment: 16)) to indicate the 16-byte alignment boundary for output signal 870.

Process 700 may also include propagating an alignment boundary to other levels of the model (block 750). For example, after annotating subsystem 850, TCE 145 may propagate the 16-byte alignment boundary to a level of model 810 that is higher than subsystem 850. In this instance, TCE 145 may determine that the level higher than subsystem 850 is model 810 (FIG. 8A). TCE 145 may further determine that input signals 860-1, 860-2, and 860-3 of subsystem block diagram 850 correspond to input signals 830-1, 830-2, and 830-3 of model 810, respectively. Accordingly, TCE 145 may propagate the 16-byte alignment boundary to input signals 830-1, 830-2, and 830-3. As shown in FIG. 8C, TCE 145 may annotate model 810, based on the propagation, by adding an indicator 835-1 (e.g., (Alignment: 16)) for input signal 830-1, an indicator 835-2 (e.g., (Alignment: 16)) for signal input 830-2, and an indicator 835-3 (e.g., (Alignment: 16)) for input signal 830-3.

TCE 145 may also determine that output 870 of subsystem block diagram 850 is connected to a signal line between block 820-1 and block 820-2 of model 810. The signal line may allow block 820-1 to provide an output signal to block 820-2. TCE 145 may annotate model 810 by adding an indicator 835-4 (e.g., (Alignment: 16)) for the signal line to indicate that the output signal is also to be aligned on a 16-byte boundary.

Thereafter, TCE 145 may propagate the alignment boundary to other variables associated with model 810. As further shown in FIG. 8C, TCE 145 may annotate model 810 by adding an indicator 835-5 (e.g., (Alignment: 16)) for input signal 830-4 and an indicator 835-6 (e.g., (Alignment: 16)) for output signal 840. In other examples, propagated alignment boundaries of a model may differ. For example, a block of a model may have two input variables that are aligned on a 16 byte boundary and one output variable that is aligned on a 32 byte boundary.

Figure 9:
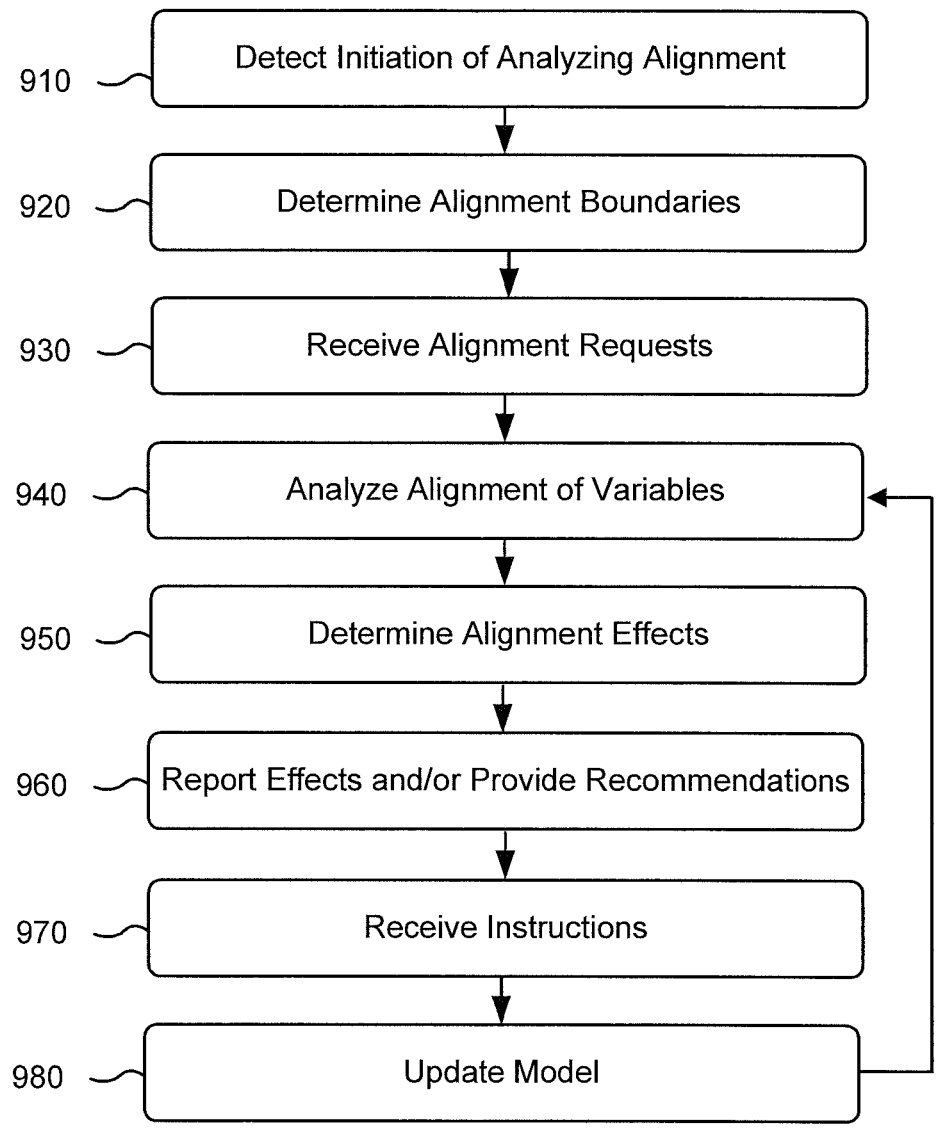
FIG. 9 is a flowchart of an example process for analyzing alignment of variables.

FIG. 9 is a flowchart of an example process 900 for analyzing alignment of variables. TCE 145 may perform process 900.

Process 900 may include detecting initiation of process to analyze alignment of variables (block 910). For example, TCE 145 may detect that a user initiated variable alignment analysis for the model when the user enters a particular input (e.g., with a keyboard). In response, TCE 145 may begin a preliminary process for conducting the variable alignment analysis.

Process 900 may further include determining alignment boundaries (block 920). For example, in one embodiment, TCE 145 may determine alignment boundaries for variables in the code corresponding to the model, as described above with reference to FIGS. 5 and 6. In another embodiment, TCE 145 may determine alignment boundaries by propagating alignment boundaries throughout the model, as described above with reference to FIG. 7.

Process 900 may also include receiving alignment requests (block 930). For example, TCE 145 may prompt the user to enter various alignment requests. The alignment requests may include, for example, values (e.g., 16) for new alignment requirements. The user may provide the values to request for the variables associated with the model to be aligned based on the values. The alignment requests may also include, for example, alignment constraints and/or optimization algorithms (e.g., loop unrolling, strength reduction, inlining, outlining, and expression folding). The alignment constraints may specify how the variables should be aligned, for example, based on different target information, based on different instructions included in the code, and/or based on particular variables used as parameters in the code. TCE 145 may modify the alignment boundaries for the variables based on the alignment requests.

Process 900 may include analyzing alignment of variables (block 940). For example, in one embodiment, TCE 145 may automatically perform one or more of a series of variable alignment analyses. In another embodiment, TCE 145 may allow the user to select which variable alignment analyses to perform. In yet another embodiment, TCE 145 may determine what variable alignment analyses to perform based on the target information and/or the alignment requests.

The variable alignment analyses may include determining whether a value of an alignment boundary for one of the variables is greater than a particular threshold. For example, TCE 145 may determine that the variables of the model are to be aligned based on a 128-byte alignment boundary because 128 is the LCM of a 16-byte alignment requirement and a 128-byte alignment requirement. TCE 145 may determine whether the 128-byte boundary is greater than a predefined threshold.

The variable alignment analyses may further include an analysis to determine whether one of the variables to be aligned is of a type that should not be aligned (e.g., it may be undesirable or nonsensical to align scalars). The variable alignment analyses may also determine whether one of the variables is to be aligned on a stack or a heap. For example, the determining may be made based on where in the code the variable is defined. The variable alignment analyses may also include an analysis to determine, based on the target information, whether one of the variables is to be promoted globally after alignment.

Process 900 may further include determining the effects of the alignment on executing the model (block 950). In other words, TCE 145 may determine what effects occur if variables associated with the model are aligned without making changes to the actual model. For example, TCE 145 may determine that if the variables are aligned based on the 128-byte alignment boundary, an excessive amount of memory (as defined by the user or TCE 145) will be used or that there is insufficient memory to execute the model. In another embodiment, the effects may be positive or negative. For example, TCE 145 may determine that less memory is used or that processing time is decreased because of a particular alignment.

Process 900 may also include reporting effects and/or providing recommendations (block 960). For example, TCE 145 may report the alignment effects, based on the variable alignment analyses, to the user. In one embodiment, TCE 145 may display an indicator that describes an alignment effect. For example, an indicator proximate to an input signal of the model may state that the variable corresponding to the input signal will be promoted globally when the model is executed. In another embodiment, TCE 145 may display a pop-up window instead of the indicator.

TCE 145 may further provide recommendation(s) regarding how to improve the model. For example, TCE 145 may display an indicator that recommends replacing an instruction, which requires a 16-byte alignment, with a different instruction that requires only a 4-byte alignment. As another example, TCE 145 may indicate that decreasing the alignment boundary for the variables associated with the model will result in an increase in the speed of executing the model.

Process 900 may also include receiving instructions (block 970). For example, TCE 145 may receive an instruction from a user in response to reporting of the effects and/or in response to the providing of the recommendations. The instructions may include, for example, changes to the model. In one embodiment, the user may enter a command to modify at least one of the one or more blocks or variables associated with the model. Additionally, or alternatively, the user may make changes to the appropriate code sections associated with the model. Additionally, or alternatively, the user may modify or retract one or more of the alignment requests set by the user. For example, the user may enter a command to set a new alignment constraint for one or more of the variables in the model.

In another embodiment, the instructions may include an acceptance or a rejection of one or more of the recommendations provided to the user. For example, the user may reject a recommendation by entering a command to remove an indicator, with the recommendation, from the model.

Process 900 may also include updating the model (block 980). For example, TCE 145 may receive the instructions entered by the user. TCE 145 may further determine whether the instructions are proper (e.g., whether a particular change to the code specified by the instructions is allowed). TCE 145 may update the model based on the instructions and when the instructions are determined to be proper. Thereafter, TCE 145 may repeat the variable alignment analyses for the updated model.

Example Distributed Network

Figure 10:
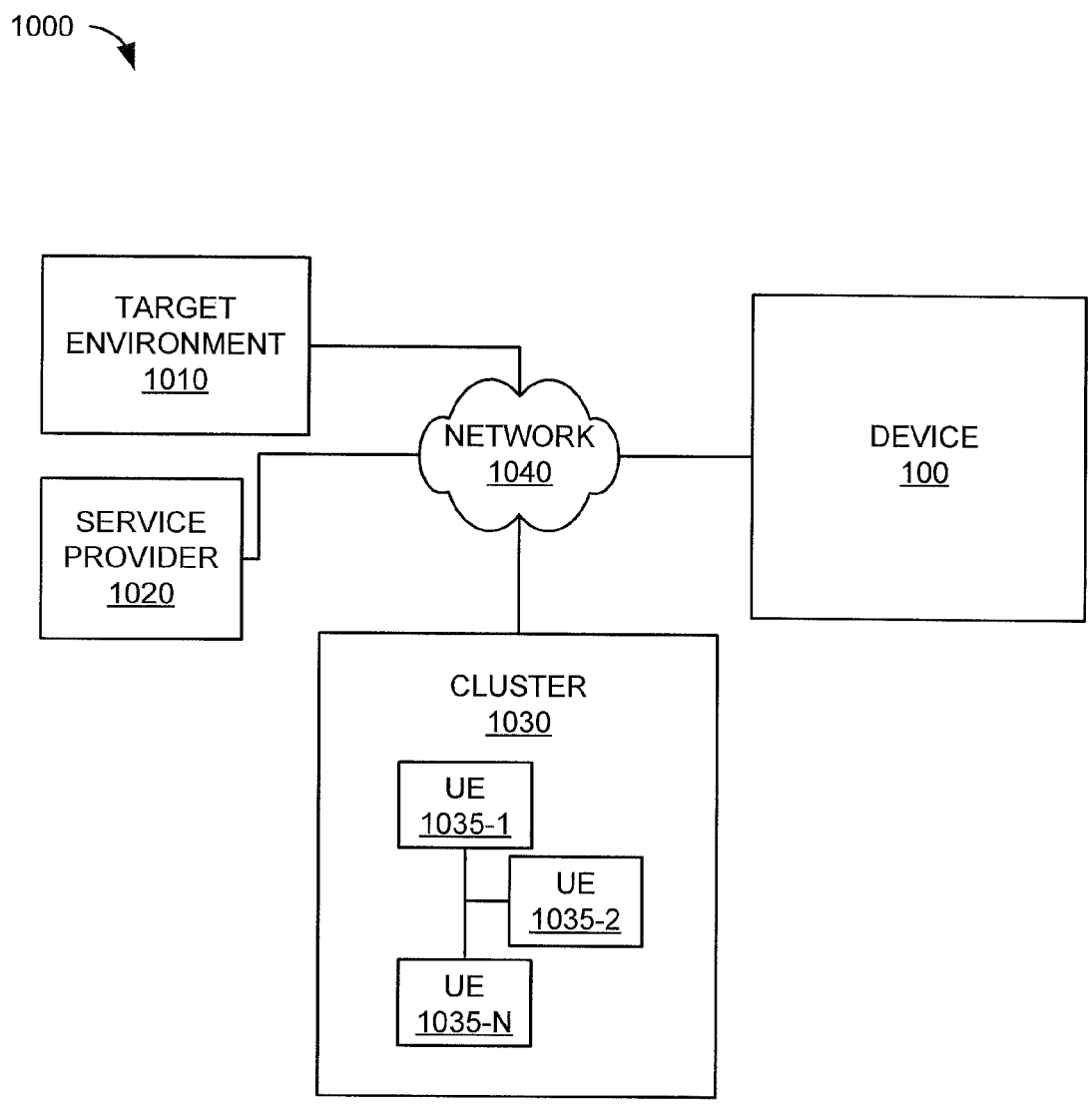
FIG. 10 diagram of an example distributed network in which systems and/or methods described herein may be implemented.

FIG. 10 illustrates an example of a distributed network 1000 in which systems and/or methods described herein may be implemented. Referring to FIG. 10, environment 1000 may contain various entities including device 100, target environment 1010, service provider 1020, cluster 1030, and network 1040. Note that the distributed environment 1000 is just one example of a distributed environment that may be used with embodiments of the invention. Other distributed environments that may be used with embodiments of the invention may contain more entities, fewer entities, entities in arrangements that differ from the arrangement illustrated in FIG. 10, and so on. Moreover, the distributed environments may be configured to implement various "cloud computing" frameworks.

Details of device 100 were described above with respect to FIG. 1. In distributed environment 1000, device 100 may be configured to, among other things, exchange information (e.g., data) with other entities in network 1040 (e.g., target environment 1010, service provider 1020, and cluster 1030). Device 100 may interface with the network 1040 via communication interface 180.

Target environment 1010 may be configured to execute and/or interpret a compiled version of a model, such as model 400, which may be generated in or otherwise available to the distributed environment 1000. The network 1040 may include a communication network capable of exchanging information between the entities in the network 1040. The network 1040 may include digital and/or analog aspects. The information may include machine-readable information having a format that may be adapted for use, for example, in the network 1040 and/or with one or more entities in the network 1040. For example, the information may be encapsulated in one or more packets that may be used to transfer the information through the network 1040.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.10, 802.11, etc.

The network 1040 may comprise various network devices, such as gateways, routers, switches, firewalls, servers, repeaters, address translators, etc. Portions of the network 1040 may be wired (e.g., using wired conductors, optical fibers, etc.) and/or wireless (e.g., using free-space optical (FSO), radio frequency (RF), acoustic transmission paths, etc.). Portions of network 1040 may include a substantially open public network, such as the Internet. Portions of the network 1040 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

The service provider 1020 may include logic that makes a service available to another entity in the distributed environment 1000. The service provider 1020 may also include a server operated by, for example, an individual, a corporation, an educational institution, a government agency, and so on, that provides one or more services to a destination, such as device 100. The services may include software containing computer-executable instructions that implement one or more embodiments of the invention or portions thereof, and may be executed, in whole or in part, by (1) a destination, (2) the service provider 1020 on behalf of the destination, or (3) some combination thereof.

For example, in an embodiment, service provider 1020 may provide one or more subscription-based services that may be available to various customers. The services may be accessed by a customer via network 1040. The customer may access the services using a computer system, such as device 100. The services may include services that implement one or more embodiments of the invention or portions thereof. The service provider 1020 may limit access to certain services based on, e.g., a customer service agreement between the customer and the service provider 1020.

The service agreement may allow the customer to access the services that may allow the customer to build, execute, and/or analyze a model, such as model 310, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources and/or network bandwidth used.

Cluster 1030 may include a number of units of execution (UEs) 1035 that may perform processing of one or more embodiments of the invention or portions thereof on behalf of device 100 and/or another entity, such as service provider 1020. The UEs 1035 may reside on a single device or chip or on multiple devices or chips. For example, the UEs 1035 may be implemented in a single ASIC or in multiple ASICs. Likewise, the UEs 1035 may be implemented in a single computer system or multiple computer systems. Other examples of UEs 1035 may include FPGAs, CPLDs, ASIPs, processors, multiprocessor systems-on-chip (MPSoCs), graphic processing units, microprocessors, etc. The UEs 1035 may be configured to perform operations on behalf of another entity. For example, in an embodiment, the UEs 1035 are configured to execute portions of code associated with TCE 145. Here, TCE 145 may dispatch certain activities pertaining to one or more embodiments of the invention to the UEs 1035 for execution. The service provider 1020 may configure cluster 1030 to provide, for example, the above-described services to computing device 100 on a subscription basis (e.g., via a web service).

CONCLUSION

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to processes of FIGS. 5, 6, 7, and 9, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions, described herein, may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable storage medium storing instructions, the instructions comprising:
a plurality of instructions which, when executed by a processor, cause the processor to:
  receive, via a technical computing environment (TCE), a request to generate code based on a model,
    the model being a block diagram model,
    a block, of the block diagram model, being associated with a variable,
      the variable being associated with at least one of:
        an input signal of the block, or
        an output signal of the block, and
      execution of the model causing the model to generate the output signal based on the input signal;
  cause, based on the request and by using the TCE, the code to be generated;
  identify, by using the TCE, a boundary for the variable based on a code section, of the code, corresponding to the block;
  generate, by using the TCE, alignment code, for the variable, based on the boundary;
  add, by using the TCE, the alignment code to the code; and
  annotate, by using the TCE and after adding the alignment code, the model to indicate that the alignment code was added to the code generated for the model.

2. The non-transitory computer-readable storage medium of claim 1,
where the variable includes a first variable associated with the input signal or a second variable associated with the output signal,
where one or more instructions, of the plurality of instructions, to identify the boundary comprise:
  one or more instructions which, when executed by the processor, cause the processor to:
    identify a first boundary for the first variable and a second boundary for the second variable, and
where one or more instructions, of the plurality of instructions, to generate the alignment code comprise:
  one or more instructions which, when executed by the processor, cause the processor to:
    generate the alignment code, for the first variable and the second variable, based on the first boundary and the second boundary.

3. The non-transitory computer-readable storage medium of claim 1, where the model uses an array-based language.

4. The non-transitory computer-readable storage medium of claim 1, where the instructions further comprise:
one or more instructions which, when executed by the processor, cause the processor to:
  align the variable based on the alignment code.

5. The non-transitory computer-readable storage medium of claim 1, where the code section comprises a single instruction, multiple data (SIMD) operation that specifies that the variable is to be aligned based on the boundary.

6. The non-transitory computer-readable storage medium of claim 1, where one or more instructions, of the plurality of instructions, to identify the boundary for the variable comprise:
one or more instructions which, when executed by the processor, cause the processor to:
identify a first instruction in the code section for which the variable is to be aligned;
identify a second instruction for which the variable is to be aligned;
determine a first alignment requirement for the variable based on the first instruction;
determine a second alignment requirement for the variable based on the second instruction; and
identify the boundary for the variable based on the first alignment requirement and the second alignment requirement.

7. The non-transitory computer-readable storage medium of claim 6, where the one or more instructions to identify the boundary for the variable based on the first alignment requirement and the second alignment requirement comprise:
one or more instructions which, when executed by the processor, cause the processor to:
determine whether a conflict exists between the first alignment requirement and the second alignment requirement;
calculate a least common multiple based on the first alignment requirement and the second alignment requirement when the conflict exists; and
identify the least common multiple as the boundary.

8. The non-transitory computer-readable storage medium of claim 1, where the instructions further comprise:
one or more instructions which, when executed by the processor, cause the processor to:
annotate the model to further indicate that the variable was aligned based on the boundary; and
provide the annotated model for display to a user,
the annotated model including information indicating that the boundary was identified, information indicating that the alignment code was added to the code, and information indicating that the variable was aligned.

9. The non-transitory computer-readable storage medium of claim 1, where the instructions further comprise:
one or more instructions which, when executed by the processor, cause the processor to:
receive a modification to the model,
where the modification provides an optimization for the model; and
update the model based on the modification.

10. The non-transitory computer-readable storage medium of claim 1, where one or more instructions, of the plurality of instructions, to identify the boundary include:
one or more instructions which, when executed by the processor, cause the processor to:
identify the boundary further based on:
one or more alignment constraints specified by a user, or
target information that includes one or more of:
information identifying a compiler that compiles the code,
information identifying a processor that executes the model,
information identifying a structure of a register associated with the model,
information identifying a structure of a cache associated with the model,
information identifying a page size, or
information identifying a memory associated with the model.

11. A method comprising:
receiving a model,
the model including a block diagram model that comprises a block, and
the receiving being performed by a technical computing environment (TCE) of a computer device;
identifying a variable, associated with the model, that is to be aligned based on one or more instructions in a section, of code generated based on the model, corresponding to the block,
the variable corresponding to an input signal of the block or an output signal of the block,
execution of the model causing the output signal to be generated based on the input signal, and
the identifying being performed by the TCE of the computer device;
determining one or more alignment requirements for the variable,
the one or more alignment requirements being determined based on the one or more instructions, and
the determining being performed by the TCE of the computer device;
generating alignment code for the variable based on the one or more alignment requirements,
the generating being performed by the TCE of the computer device;
including the alignment code in the code generated based on the model,
the including being performed by the TCE of the computer device; and
annotating, after including the alignment code, the model to indicated that the alignment code was included in the code generated for the model,
the annotating the model to indicate that the alignment code was included being performed by the TCE of the computer device.

12. The method of claim 11, further comprising:
compiling the code,
compiling the code including:
aligning the variable in memory based on the alignment code and during a defining of the variable.

13. The method of claim 11,
where determining the one or more alignment requirements for the variable comprises:
retrieving an alignment constraint specified by a user to use as one of the one or more alignment requirements, and
where generating the alignment code comprises:
determining an alignment boundary based on the one or more alignment requirements, and
using a value of the alignment boundary in the alignment code.

14. The method of claim 11,
where determining the one or more alignment requirements for the variable comprises:
determining a first alignment requirement for the variable specified by a first instruction of the one or more instructions; and determining a second alignment requirement for the variable specified by a second instruction of the one or more instructions, and where the one or more alignment requirements include the first alignment requirement and the second alignment requirement.

15. The method of claim 14, where generating the alignment code comprises:

determining whether a conflict exists between the first alignment requirement and the second alignment requirement;

calculating a least common multiple based on the first alignment requirement and the second alignment requirement when the conflict exists; and generating the alignment code based on the least common multiple.

16. The method of claim 11, further comprising:

retrieving the one or more instructions based on the block, the input signal, and the output signal.

17. The method of claim 11, where including the alignment code comprises:

identifying a section of the code where the variable is defined; and inserting the alignment code, for the variable, at a location in the code that precedes the section.

18. A system comprising:

a memory to store one or more instructions; and a processor to:

receive a model via a technical computing environment (TCE), the model including a block diagram model that includes a block, receive, by using the TCE, a request to generate code based on the model, the code including the one or more instructions, and the one or more instructions being associated with the block, cause, by using the TCE and based on the request, the code to be generated, identify, by using the TCE and based on the one or more instructions, a variable that is to be aligned, the variable corresponding to an input signal of the block, execution of the model causing an output signal, of the block, to be generated based on the input signal, determine, by using the TCE, a boundary for the variable based on the one or more instructions, generate, by using the TCE, alignment code based on the boundary, add, by using the TCE, the alignment code, to the code, for the variable to align the variable, and annotate, by using the TCE and after adding the alignment code, the model to indicate that the alignment code was added to the code generated for the model.

19. The system of claim 18, where the variable corresponds to a first variable, where the processor is further to:

identify, based on the one or more instructions, a second variable that is to be aligned, where the second variable corresponds to the output signal of the block, and where, when adding the alignment code, the processor is to add the alignment code at a location, in the code, that precedes a location where the second variable is defined in the code.

20. The system of claim 18, where the variable corresponds to a first variable, and where the processor is further to:

align the first variable, in the memory, based on the alignment code, and align a second variable, in the memory, based on the alignment code.

21. The system of claim 18, where the processor is further to:

generate a new model based on the model and at least one of identifying of the variable, determining the boundary, or adding the alignment code, and provide the new model for display.

22. The system of claim 21, where the processor is further to:

receive a modification to the new model, the modification optimizing the new model, and generate new code based on the new model and the modification.

23. The system of claim 18, where the block corresponds to a first block, where the one or more instructions correspond to a first set of one or more instructions, where the boundary corresponds to a first boundary, where the model includes a second block, and where the processor is further to:

identify, based on a second set of one or more instructions, one or more variables associated with the second block that are to be aligned, determine, based on the second set of one or more instructions, a second boundary for the one or more variables associated with the second block, the first boundary being different than the second boundary, and add different alignment code, based on the second boundary, to the code to align the one or more variables associated with the second block.

24. One or more non-transitory computer-readable storage media storing instructions, the instructions comprising:

a plurality of instructions which, when executed by a processor, cause the processor to:

receive a model via a technical computing environment (TCE), the model including a block diagram model that comprises one or more blocks and variables associated with the one or more blocks, the variables corresponding to one or more input signals and one or more output signals, and an execution of the model causing the one or more output signals to be generated based on the one or more input signals;

identify, by using the TCE, target information associated with processing of the model;

determine, by using the TCE, alignment boundaries for the variables based on the target information;

conduct, by using the TCE, alignment analyses of aligning the variables based on the alignment boundaries;

determine, by using the TCE, an effect of aligning the variables on the execution of the model based on a result of conducting the alignment analyses; and provide, by using the TCE and for display, at least one of information regarding the effect of aligning the variables on the execution of the model or a recommendation for altering the model to change the effect.

25. The one or more non-transitory computer-readable storage media of claim 24, where the target information comprises at least one of:

compiler information relating to a compiler that compiles code corresponding to the model, processor information relating to a processor that executes the code,
register structure information,
cache structure information, or
memory information.

26. The one or more non-transitory computer-readable storage media of claim 24, where one or more instructions, of the plurality of instructions to determine the alignment boundaries comprise:
one or more instructions which, when executed by the processor, cause the processor to:
receive alignment requests from a user,
the alignment requests including at least one of:
an alignment requirement for one or more of the variables, or
an alignment constraint set by a user, and
determine the alignment boundaries for the variables based on the target information and the alignment requests.

27. The one or more non-transitory computer-readable storage media of claim 24, where the result comprises at least one of:
a result indicating that a value of a boundary for alignment of one of the variables is greater than a particular threshold,
a result indicating that one of the variables aligns on a heap, or
a result indicating that one of the variables is promoted globally when aligned.

28. The one or more non-transitory computer-readable storage media of claim 24, where the instructions further comprise:
one or more instructions which, when executed by the processor, cause the processor to:
receive particular instructions from the user, after providing the at least one of the information regarding the effect or the recommendation,
the particular instructions including at least one of:
a command to set a new alignment constraint for one or more of the variables in the model,
a command to modify at least one of the one or more blocks or the variables of the model, or
a command to remove, from the model, the displaying of the effect or the recommendation, and
update the model based on the particular instructions.

29. The one or more non-transitory computer-readable storage media of claim 24,
where the effect of aligning the variables on the execution of the model includes:
an effect on an amount of memory used for the execution of the model, or
an effect on a processing time associated with the execution of the model, and
where the recommendation for altering the model to change the effect includes:
a recommendation to replace a particular instruction, associated with the model, with another instruction, or
a recommendation to decrease a particular alignment boundary of the alignment boundaries.

\* \* \* \* \*